United States Patent
Ben David et al.

(10) Patent No.: US 11,034,255 B2
(45) Date of Patent: Jun. 15, 2021

(54) SYSTEM AND METHOD FOR A STATION PROVIDING GRID SUPPORT

(71) Applicant: CHAKRATEC LTD., Lod (IL)

(72) Inventors: Ilan Ben David, Rosh Haayin (IL); David Pincu, Holon (IL); Nir Zohar, Rishon Lezion (IL)

(73) Assignee: CHAKRATEC LTD., Lod (IL)

( * ) Notice: Subject to any disclaimer, the term of this patent is extended or adjusted under 35 U.S.C. 154(b) by 142 days.

(21) Appl. No.: 16/345,711

(22) PCT Filed: Oct. 25, 2017

(86) PCT No.: PCT/IL2017/051170
§ 371 (c)(1),
(2) Date: Apr. 28, 2019

(87) PCT Pub. No.: WO2018/078625
PCT Pub. Date: May 3, 2018

(65) Prior Publication Data
US 2019/0351781 A1   Nov. 21, 2019

Related U.S. Application Data

(60) Provisional application No. 62/414,747, filed on Oct. 30, 2016.

(51) Int. Cl.
*H02J 7/02* (2016.01)
*H02J 3/30* (2006.01)
(Continued)

(52) U.S. Cl.
CPC .............. *B60L 53/62* (2019.02); *B60L 53/31* (2019.02); *B60L 53/56* (2019.02); *H02J 3/30* (2013.01); *H02J 7/022* (2013.01); *B60L 2210/30* (2013.01)

(58) Field of Classification Search
CPC .......... B60L 53/62; B60L 53/31; B60L 53/56; B60L 2210/30; H02J 3/30; H02J 7/022; Y02T 10/70; Y02T 10/7072; Y02T 90/12
(Continued)

(56) References Cited

U.S. PATENT DOCUMENTS 5,739,596 A    4/1998  Takizawa et al.
5,786,682 A    7/1998  Aiken et al.
(Continued)

FOREIGN PATENT DOCUMENTS

| CN | 203119680 U | 12/2012 |
|---|---|---|
| DE | 102009055845 A1 | 6/2011 |
| JP | 11H296787 A | 10/1999 |

OTHER PUBLICATIONS

International Search Report for PCT/IL2017/051170 dated Jun. 20, 2018 by European Patent Office.
(Continued)

*Primary Examiner* — Toan T Vu
(74) *Attorney, Agent, or Firm* — Webb and Co. Ltd.; Chanoch Kahn

(57) ABSTRACT

A station constituted of: a control circuit; a bidirectional interface coupling to an AC grid; one of a load and an arrangement for coupling to a load, the load presenting a time varying electrical energy consumption to the station; and a plurality of flywheel based electrical storage units coupled to the bidirectional interface, wherein the control circuit is arranged to: in the event that the power drawn by the station is less than a first threshold value, and the plurality of flywheel based electrical storage units are not fully charged, charge at least one of the plurality of flywheel based electrical storage units; and in the event that the power drawn by the station is greater than a second threshold value, and the plurality of flywheel based electrical storage units
(Continued)

are not fully discharged, provide electrical energy from at least one of the plurality of flywheel based electrical storage units.

15 Claims, 10 Drawing Sheets

(51) Int. Cl.
  *B60L 53/62* (2019.01)
  *B60L 53/31* (2019.01)
  *B60L 53/56* (2019.01)

(58) Field of Classification Search
  USPC .......................... 307/9.1, 10.1; 320/108, 109
  See application file for complete search history.

(56) References Cited

U.S. PATENT DOCUMENTS

| | | | |
|---|---|---|---|
| 6,246,214 B1 | 6/2001 | Oglesbee | |
| 6,507,172 B2 | 1/2003 | Sherman | |
| 6,861,824 B1 | 3/2005 | Liu et al. | |
| 7,443,049 B1 | 10/2008 | Jones et al. | |
| 7,525,291 B1 | 4/2009 | Ferguson | |
| 7,528,582 B1 | 5/2009 | Ferguson | |
| 9,667,117 B2 | 5/2017 | Ben David et al. | |
| 2002/0021164 A1 | 2/2002 | Fugate et al. | |
| 2002/0036430 A1 | 3/2002 | Welches et al. | |
| 2002/0096412 A1 | 7/2002 | Batisse | |
| 2003/0054703 A1 | 3/2003 | Fisher et al. | |
| 2005/0146219 A1 | 7/2005 | Pincu et al. | |
| 2011/0074350 A1 | 3/2011 | Kocher | |
| 2011/0074361 A1 | 3/2011 | Tao et al. | |
| 2011/0204720 A1 | 8/2011 | Ruiz et al. | |
| 2011/0273022 A1 | 11/2011 | Dennis et al. | |
| 2011/0276194 A1 | 11/2011 | Emalfarb et al. | |
| 2012/0146587 A1 | 6/2012 | Srinivasan et al. | |
| 2015/0328999 A1* | 11/2015 | Dureau | H02J 7/0026 320/109 |

OTHER PUBLICATIONS

Written Opinion of the International Searching Authority for PCT/IL2017/051170 dated Jun. 20, 2018 by European Patent Office.
Flexible Electric Vehicle Charging Infrastructure (Flex—ChEV) published by Narvik University College, Apr. 29, 2016, downloaded from www.Energiforskning.dk.
Data Sheet for MAX8903 2A 1-Cell Li+ DC-DC Chargers for USB and Adapter Power, Published Aug. 2009, Maxim Integrated Products, Sunnyvale, CA.

* cited by examiner

SYSTEM AND METHOD FOR A STATION PROVIDING GRID SUPPORT

TECHNICAL FIELD

The present invention relates to the field of managing electrical power draw from an AC grid, and in particular a method and system for supporting a station having on board energy storage capability and an associated load which varies over time, while providing grid ancillary services such as a sink/source for overusage/underusage of a sub-grid.

BACKGROUND

Plug-in electrical vehicles (EVs) are gaining in popularity, thus causing an increase in electrical demand from the power grid. EV fast charging stations (EVFCSs) are being provided, which can rapidly charge such plug-in EVs, however their power draw from the grid may provide large load fluctuations which may cause mismatch between available power and power being required by the EVFCS.

Electrical power distribution has undergone dramatic changes over the last few years. Whereas in the past a single supplier has been responsible to both produce the electricity and deliver to the ultimate client, presently production, transmission and distribution are often separated and may be handled by different parties. The European Commission, in order to enable proper regulation of the various portions of the market, has defined a layered definition of the electrical energy market, namely: Power Generator (PG); Transmission Service Operator (TSO); and Distribution Service Operator (DSO). The PG is responsible to generate electricity; the TSO is responsible to transmit the electricity from the GSO to a distribution point; and the DSO is responsible for operating, ensuring the maintenance of and, if necessary, developing the distribution system in a given area and, where applicable, its interconnections with other systems and for ensuring the long term ability of the system to meet reasonable demands for the distribution of electricity. In essence the DSO distributes electrical power from the distribution point to the ultimate consumer.

In such a system, maintenance of a balance between electricity generation, distribution, and consumption is more complex, since multiple independent players are involved. Proper planning ensures that low cost provision method can be utilized. However, demand in excess of plan, and demand below plan, does occur. These discrepancies from plan incur costs, which can be quite substantial, and therefore are charged at much higher rates.

The combination of the above 2 leads to a problematic situation for EVFCSs, which can not accurately predict their precise load being presented to the DSO. One solution to this problem is to provide the EVFCS with on-board electrical storage capability, which enables the EVFCS to provide a constant predetermined load to the DSO, while handling fluctuations presented by the unpredictable arrival, and charging, of EVs, response to the on-board electrical storage capability. Various types of on-board electrical storage are known to the art, including capacitors and flywheels. One such flywheel is taught in International Application Publication WO2014/020593 entitled "Magnetically Coupled Flywheel", the entire contents of which is incorporated herein by reference.

The DSO may however experience discrepancies in load balance caused by other consumers, and this may present an opportunity to the EVFCS, in the event that the EVFCS can continue to serve incoming electrical vehicles, while assisting the DSO with its load balance discrepancy. Unfortunately, the prior art does not provide such a solution.

SUMMARY

Accordingly, it is a principal object to overcome at least some of the disadvantages of prior art. This is accomplished in certain embodiments by a station comprising: a control circuit; a bidirectional interface for coupling to an AC grid; one of a load and an arrangement for coupling to a load, the load presenting a time varying electrical energy consumption to the station; and a plurality of flywheel based electrical storage units coupled to the bidirectional interface, wherein the control circuit is arranged to: in the event that the power drawn by the station is less than a first threshold value, and the plurality of flywheel based electrical storage units are not fully charged, charge at least one of the plurality of flywheel based electrical storage units; and in the event that the power drawn by the station is greater than a second threshold value, and the plurality of flywheel based electrical storage units are not fully discharged, provide electrical energy from at least one of the plurality of flywheel based electrical storage units.

In one further embodiment, the first threshold value is a maximum value less a predetermined amount, and the second threshold value is the maximum value plus the predetermined amount. In another further embodiment, the control circuit is further arranged when charging at least one of the plurality of flywheel based electrical storage units to ensure that the power drawn by the station is less a maximum value.

In one further embodiment, in the event that power is provided from the at least one of the plurality of flywheel based electrical storage units, the control circuit is further arranged to ensure that the amount of power provided from the at least one of the plurality of flywheel based electrical storage units is sufficient to ensure that power drawn by the station is less than, or equal to, the second threshold value.

In one further embodiment, in the event that the power drawn by the station is greater than the second threshold value, and the plurality of flywheel based electrical storage units are fully discharged, the control circuit is further arranged to output a signal to reduce power drawn by a load. In one yet further embodiment the load comprises a plug in electrical vehicle, and wherein the station comprises one of: a DC/DC charging unit arranged for coupling to the plug in electrical vehicle; and an AC/DC charging unit arranged for coupling to the plug in electrical vehicle. In another yet further embodiment, the signal is arranged to disable the load.

Independently, embodiments herein provide for a method of controlling a station having on board electrical storage and one of a load and an arrangement for coupling to a load, the load presenting a time varying electrical energy consumption to the station, the method comprising: determining the amount of power drawn by the station from an AC grid; in the event that the power drawn by the station is less than a first threshold value, and the on-board electrical storage is not fully charged, charge the on-board electrical storage; and in the event that the power drawn by the charging station is greater than overage second threshold value, and the on-board electrical storage are not fully discharged, provide electrical energy from the on-board electrical storage.

In one further embodiment, the first threshold value is a maximum value less a predetermined amount, and the second threshold value is the maximum value plus the predetermined amount. In another further embodiment, the method further comprises: ensuring, when charging the on-board electrical storage, that the power drawn by the station is less a maximum value.

In one further embodiment, in the event that power is provided from the on-board electrical storage, ensuring that the amount of power provided from the on-board electrical storage is sufficient to ensure that power drawn by the station is less than, or equal to, the second threshold value. In one yet further embodiment, in the event that the power drawn by the station is greater than the second threshold value, and the on-board electrical storage are fully discharged, outputting a signal to reduce power drawn by the load. In one yet further, further embodiment, the load is one of: a DC/DC charging unit arranged for coupling to a plug in electrical vehicle; and an AC/DC charging unit arranged for coupling to the plug in electrical vehicle. In another yet further embodiment, the outputted signal is arranged to disable the load.

Independently, embodiments herein provide for a station comprising: a control circuit; a bidirectional interface for coupling to an AC grid; and a plurality of N flywheel based electrical storage units coupled to the bidirectional interface, wherein the control circuit is arranged to: determine a demand for electrical power of an amount Preq; determine a maximum amount of allowed ripple current; determine available power from each of the plurality of N flywheel based electrical storage units; select M+1 of the plurality of flywheel based electrical storage units having the highest determined available power such that the power available from the selected M of the plurality of flywheel based electrical storage units is less than Preq, and that the power available from the selected M+1 of the plurality of flywheel based electrical storage units is greater than, or equal to, Preq; determine the desired change in output current for each of the N plurality of flywheel based electrical storage units; reduce the output current of one of the N plurality of flywheel based electrical storage units for which the determination indicates a negative desired change up to the determined maximum ripple current; increase the output current of one of the N plurality of flywheel based electrical storage units for which the determination indicates a positive desired change up to the determined maximum ripple current; compare the output current of the N plurality of flywheel based electrical storage units to the determined desired changes; and repeat the reducing, increasing and comparing until the determined desired change in output current for each of the N plurality of flywheel based electrical storage units is implemented.

In one further embodiment, the bidirectional interface comprises a bidirectional AC/DC converter, and wherein the station further comprises: at least one of an AC/DC charging and a DC/DC charging unit coupled to the one of a bidirectional AC/DC converter and arranged for coupling to a plug in electrical vehicle. In another further embodiment, the control circuit is further in communication with a distribution service operator, the control circuit arranged to provide power to the AC grid responsive to a first request from the distribution service operator, and draw power from the AC grid responsive to a second request from the distribution service operator, and wherein the control circuit is further arranged to allocate a storage ability of the plurality of N flywheel based electrical storage units among: a first portion allocated to provide power to the at least one AC/DC charging unit or DC/DC charging unit; a second portion allocated to absorb electrical energy from the AC grid; and a third portion allocated to provide electrical energy to the AC grid. In one yet further embodiment, the first portion, second portion and third portion are allocated responsive to historical data.

In one further embodiment, the station further comprises: a DC/DC charging unit arranged for coupling to a plug in electrical vehicle, and wherein the bidirectional interface comprises a bidirectional AC/DC converter, each of the plurality of flywheel based electrical storage units coupled to a common DC bus to provide power to the DC/DC charging unit and to provide power to, or receive power from, the bidirectional AC/DC converter. In one yet further embodiment, the station further comprises: a voltage sensor coupled to the common DC bus and in communication with the control circuit; a current sensor coupled to the DC/DC charging unit and in communication with the control circuit; and a power sensor coupled to the bidirectional AC/DC converter and in communication with the control circuit, the control circuit arranged to determine the amount of power drawn by, or provided from, the station, responsive to the power sensor coupled to the bidirectional AC/DC converter.

In one further embodiment, the station further comprises: an AC/DC charging unit arranged for coupling to a plug in electrical vehicle, and wherein the bidirectional interface comprises a bidirectional AC/DC converter, the AC/DC charging unit coupled to a common node of the station, each of the plurality of flywheel based electrical storage units coupled to a common DC bus to provide power to, or receive power from, the bidirectional AC/DC converter; a first power sensor coupled between the AC grid and the common node, the first power sensor in communication with the control circuit; and a second power sensor coupled between the common node and the bidirectional AC/DC converter, the second power sensor in communication with the control circuit. In one yet further embodiment, the control circuit is further arranged to: determine an amount of power to store, Pavail; determine a maximum amount of allowed ripple current; determine available power storage from each of the plurality of N flywheel based electrical storage units; select M+1 of the plurality of flywheel based electrical storage units having the lowest determined available power such that the power available from the selected M of the plurality of flywheel based electrical storage units is greater than Pavail, and that the power available from the selected M+1 of the plurality of flywheel based electrical storage units is less than, or equal to, Pavail; determine the desired change in output current for each of the N plurality of flywheel based electrical storage units; increase the output current of one of the N plurality of flywheel based electrical storage units for which the determination indicates a positive desired change up to the determined maximum ripple current; decrease the output current of one of the N plurality of flywheel based electrical storage units for which the determination indicates a negative desired change up to the determined maximum ripple current; compare the output current of the N plurality of flywheel based electrical storage units to the determined desired changes; and repeat the increasing, reducing and comparing until the determined desired change in output current for each of the N plurality of flywheel based electrical storage units is implemented.

In one further embodiment, the control circuit is further in communication with a distribution service operator, the control circuit arranged to provide power to the AC grid responsive to a first request from the distribution service operator, and draw power from the AC grid responsive to a second request from the distribution service operator.

Independently, embodiments herein provide for a method of controlling a plurality of N flywheel based electrical storage units comprising: determining a demand for electrical power of an amount Preq; determining a maximum amount of allowed ripple current; determining available power from each of the plurality of N flywheel based electrical storage units; selecting M+1 of the plurality of flywheel based electrical storage units having the highest determined available power such that the power available from the selected M of the plurality of flywheel based electrical storage units is less than Preq, and that the power available from the selected M+1 of the plurality of flywheel based electrical storage units is greater than, or equal to, Preq; determining the desired change in output current for each of the N plurality of flywheel based electrical storage units; reducing the output current of one of the N plurality of flywheel based electrical storage units for which the determination indicates a negative desired change up to the determined maximum ripple current; increasing the output current of one of the N plurality of flywheel based electrical storage units for which the determination indicates a positive desired change up to the determined maximum ripple current; comparing the output current of the N plurality of flywheel based electrical storage units to the determined desired changes; and repeating the reducing, increasing and comparing until the determined desired change in output current for each of the N plurality of flywheel based electrical storage units is implemented.

In one further embodiment, the method further comprises: providing power to an AC grid responsive to a first request from a distribution service operator; drawing power from the AC grid responsive to a second request from the distribution service operator; and allocating a storage ability of the plurality of N flywheel based electrical storage units among: a first portion allocated to provide power to at least one AC/DC charging unit or DC/DC charging unit; a second portion allocated to absorb electrical energy from the AC grid; and a third portion allocated to provide electrical energy to the AC grid. In one yet further embodiment, the first portion, second portion and third portion are allocated responsive to historical data.

In one further embodiment, the method further comprises: determining an amount of power to store, Pavail; determining a maximum amount of allowed ripple current; determining available power storage from each of the plurality of N flywheel based electrical storage units; selecting M+1 of the plurality of flywheel based electrical storage units having the lowest determined available power such that the power available from the selected M of the plurality of flywheel based electrical storage units is greater than Pavail, and that the power available from the selected M+1 of the plurality of flywheel based electrical storage units is less than, or equal to, Pavail; determining the desired change in output current for each of the N plurality of flywheel based electrical storage units; increasing the output current of one of the N plurality of flywheel based electrical storage units for which the determination indicates a positive desired change up to the determined maximum ripple current; decreasing the output current of one of the N plurality of flywheel based electrical storage units for which the determination indicates a negative desired change up to the determined maximum ripple current; comparing the output current of the N plurality of flywheel based electrical storage units to the determined desired changes; and repeating the increasing, reducing and comparing until the determined desired change in output current for each of the N plurality of flywheel based electrical storage units is implemented.

In one further embodiment, the method further comprises: providing power to the AC grid responsive to a first request from the distribution service operator; and drawing power from the AC grid responsive to a second request from the distribution service operator. In another further embodiment, the method further comprises: providing power to the AC grid responsive to a first request from the distribution service operator; and drawing power from the AC grid responsive to a second request from the distribution service operator.

Independently, the embodiments herein provide for a station comprising: a control circuit; a first and a second bi-directional converter, each in communication with the control circuit, each arranged to be coupled to a respective plug-in electrical vehicle at a respective first port thereof, each having a respective second port commonly coupled, wherein the control circuit is arranged to: draw electrical energy from a first plug-in electrical vehicle coupled to the first port of the first bi-directional converter; and provide at least some of the drawn electrical energy to a second plug-in electrical vehicle coupled to the first port of the second bi-directional converter.

In one further embodiment, the amount of electrical energy drawn from the first plug-in electrical vehicle to the commonly coupled second port of the first bi-directional converter is substantially equal to the amount of electrical energy provided to the commonly coupled second port of second bi-directional converter. In another further embodiment each of the first and the second bi-directional converters are bi-directional DC/DC converters, and wherein the coupling is through a DC bus.

In one further embodiment, each of the first and the second bi-directional converters are bi-directional AC/DC converters. In one yet further embodiment, the station further comprises an electrical storage unit, wherein in the event that the amount of electrical energy drawn from the first plug-in electrical vehicle to the commonly coupled second port of the first bi-directional converter is greater than the amount of electrical energy provided to the commonly coupled second port of second bi-directional converter, the control circuit is arranged to store a difference in electrical energy on the electrical storage unit.

In one yet further embodiment, the station further comprises an electrical storage unit, wherein in the event that the amount of electrical energy drawn from the first plug-in electrical vehicle to the commonly coupled second port of the first bi-directional converter is less than the amount of electrical energy provided to the commonly coupled second port of second bi-directional converter, the control circuit is arranged to provide a difference in electrical energy from the electrical storage unit. In another yet further embodiment, the station further comprises a connection to an AC grid, wherein in the event that the amount of electrical energy drawn from the first plug-in electrical vehicle to the commonly coupled second port of the first bi-directional converter is greater than the amount of electrical energy provided to the commonly coupled second port of second bi-directional converter, the control circuit is arranged to provide a difference in electrical energy to the AC grid.

In one yet further embodiment the station further comprises a connection to an AC grid, wherein in the event that the amount of electrical energy drawn from the first plug-in electrical vehicle to the commonly coupled second port of the first bi-directional converter is less than the amount of electrical energy provided to the commonly coupled second port of second bi-directional converter, the control circuit is arranged to provide a difference in electrical energy from the AC grid.

Independently, embodiments herein provide for a method of providing electrical energy to a plug-in electrical vehicle comprising: drawing electrical energy from a first plug-in electrical vehicle coupled to a first port of a first bi-directional converter; and providing at least some of the drawn electrical energy to a second plug-in electrical vehicle coupled to a first port of a the second bi-directional converter.

In one further embodiment, the amount of electrical energy drawn from the first plug-in electrical vehicle, as determined at a second port of the first bi-directional converter, is substantially equal to the amount of electrical energy provided to the second plug-in electrical vehicle as determined at a second port of the second bi-directional converter. In another further embodiment, each of the first and second bi-directional converters are bi-directional DC/DC converters.

In one further embodiment, each of the first and the second bi-directional converters are bi-directional AC/DC converters. In one yet further embodiment, in the event that an amount of electrical energy drawn from the first plug-in electrical vehicle, as determined at a second port of the first bi-directional converter, is greater than the amount of electrical energy provided to the commonly coupled second port of second bi-directional converter, as determined at a second port of the second bi-directional converter, storing a difference in electrical energy on an associated electrical storage unit.

In one yet even further embodiment, in the event that an amount of electrical energy drawn from the first plug-in electrical vehicle, as determined at a second port of the first bi-directional converter, is less than the amount of electrical energy provided to the commonly coupled second port of second bi-directional converter, as determined at a second port of the second bi-directional converter, providing a difference in electrical energy from an associated electrical storage unit. In another yet even further embodiment, in the event that an amount of electrical energy drawn from the first plug-in electrical vehicle, as determined at a second port of the first bi-directional converter, is greater than the amount of electrical energy provided to the commonly coupled second port of second bi-directional converter, as determined at a second port of the second bi-directional converter, providing a difference in electrical energy to a coupled AC grid. In yet another further embodiment, in the event that an amount of electrical energy drawn from the first plug-in electrical vehicle, as determined at a second port of the first bi-directional converter, is less than the amount of electrical energy provided to the commonly coupled second port of second bi-directional converter, as determined at a second port of the second bi-directional converter, providing a difference in electrical energy from a coupled AC grid.

Independently, the embodiments herein provide for: a method of allocating storage in electrical storage units, comprising: for each of a plurality of historical time periods, generating an array of potential values for an amount of electrical storage to be allocated for plug-in electrical vehicles; an amount of electrical storage to be allocated for providing electrical energy to the AC grid; and an amount of electrical storage to be allocated for storing electrical energy from the AC grid; for each of the plurality of historical time periods, determining an optimal economic allocation; and for future time periods, providing an allocation in accordance with the determined optimal economic allocation.

In one further embodiment, the plurality of historical time periods are segregated according to at least one of: weekdays, weekends, holidays and seasons. In another further embodiment, for each of the plurality of historical time periods the sum of the amount of electrical storage to be allocated for plug-in electrical vehicles; the amount of electrical storage to be allocated for providing electrical energy to the AC grid; and the amount of electrical storage to be allocated for storing electrical energy from the AC grid is equal to 100% of a total energy capacity of on-board storage units. In another further embodiment, the range of provided allocations in accordance with the determined optimal economic allocation are limited to be within predetermined ranges.

Independently, the embodiments herein provide for a station comprising: a control circuit; a bidirectional interface for coupling to an AC grid; a plurality of electrical storage units coupled to the bidirectional interface; and at least one of an AC/DC charging and a DC/DC charging unit coupled to the bidirectional interface for coupling to an AC grid and arranged for coupling to a plug in electrical vehicle, wherein the control circuit is arranged to: for each of a plurality of historical time periods, generate an array of potential values for an amount of electrical storage to be allocated for plug-in electrical vehicles; an amount of electrical storage to be allocated for providing electrical energy to the AC grid; and an amount of electrical storage to be allocated for storing electrical energy from the AC grid; for each of the plurality of historical time periods, determine an optimal economic allocation; and for future time periods, provide an allocation in accordance with the determined optimal economic allocation.

In one further embodiment, the plurality of historical time periods are segregated according to at least one of: weekdays, weekends, holidays and seasons. In one yet further embodiment, for each of the plurality of historical time periods the sum of the amount of electrical storage to be allocated for plug-in electrical vehicles; the amount of electrical storage to be allocated for providing electrical energy to the AC grid; and the amount of electrical storage to be allocated for storing electrical energy from the AC grid is equal to 100% of a total energy capacity of the plurality of electrical storage units. In another yet further embodiment, the range of provided allocations in accordance with the determined optimal economic allocation are limited to be within predetermined ranges.

Additional features and advantages will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1A:
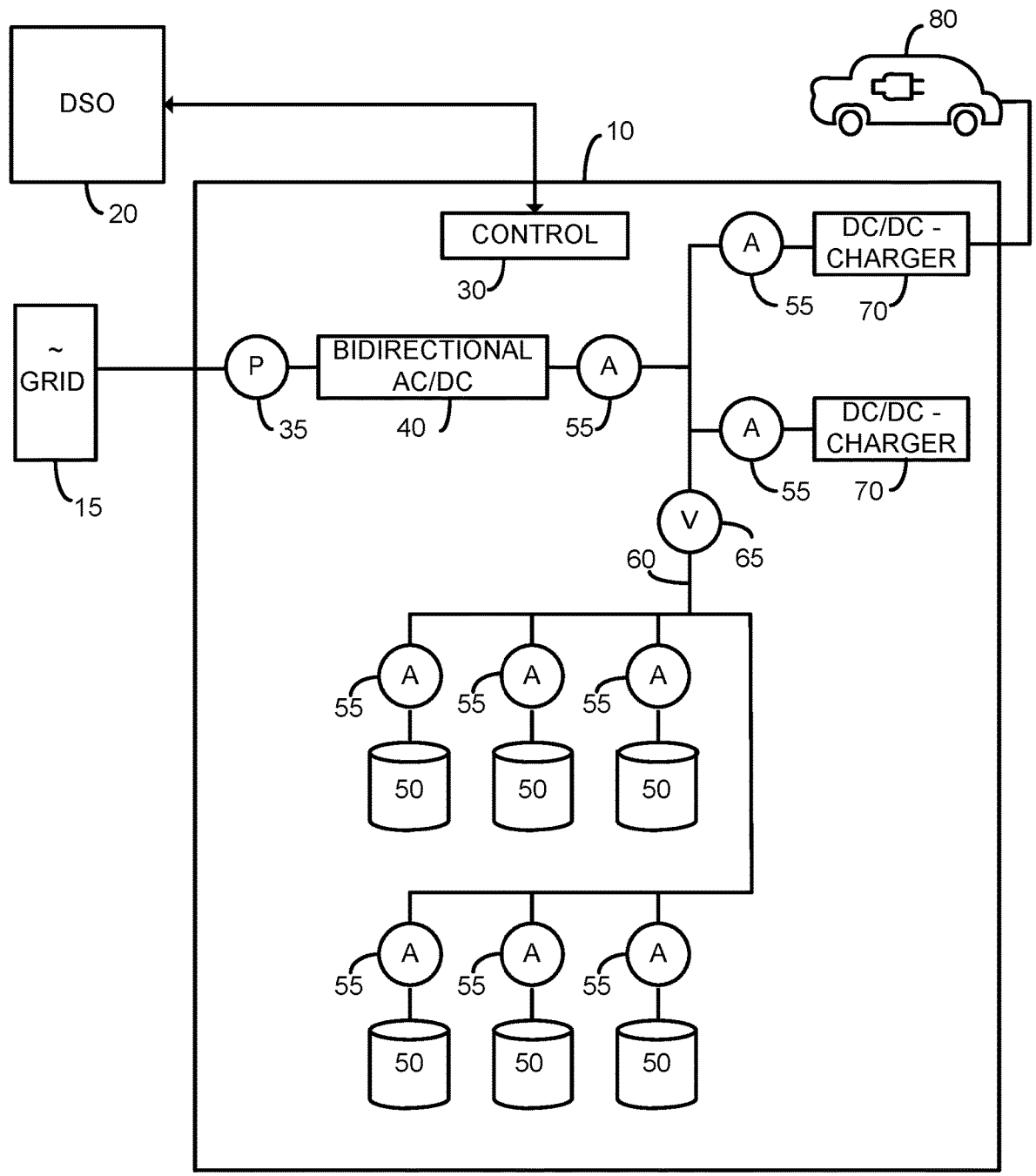
FIG. 1A illustrates a high level block diagram of an embodiment of an electric vehicle fast charging station coupled to an AC grid via a bi-directional AC/DC converter, where an electrical vehicle is charged via a DC/DC charger.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The embodiments are particularly described in relation to a fast charging station, particularly and EVFCS, however this is not meant to be limiting in any way. The embodiments are equally applicable for an energy storage station for use in connection with an alternating current (AC) grid having a load, whose energy consumption varies over time.

FIG. 1A illustrates a high level block diagram of an embodiment of an EVFCS 10 arranged to provide a fast charge for a plug-in electric vehicle (PEV) 80, EVFCS 10 is coupled to an AC grid 15 via a bi-directional AC/DC converter 40 and in communication with a DSO 20. While a single bi-directional AC/DC converter 40 is illustrated, this is not meant to be limiting in any way, and a plurality of bi-directional AC/DC converters 40 may be provided, operating in parallel, without exceeding the scope. EVFCS 10 comprises: a control circuit 30; a power sensor 35; a bi-directional AC/DC converter 40; a plurality of electrical storage units 50; a plurality of current sensors 55; a DC bus 60; a voltage sensor 65; and a plurality of DC/DC charging units 70. Each electrical storage unit 50 may be constituted of magnetically coupled flywheel, without limitation, and as will be described further below may incorporate a servo amplifier in communication with a motor/generator. Each electrical storage unit 50 may have a power converter associated therewith, and optionally a local controller, as known to those skilled in the art (not shown for simplicity) and incorporate a respective current sensor 55. Each DC/DC charging unit 70 has a respective current sensor 55 associated therewith, and bi-directional AC/DC converter 40 has a respective current sensor 55 associated therewith arranged to sense the current flow to/from DC bus 60. DSO 20 is in bidirectional communication with control circuit 30, either over a dedicated connection, or via an Internet link. Control circuit 30 is in communication with: power sensor 35; bi-directional AC/DC converter 40; each electrical storage unit 50; each current sensor 55, voltage sensor 65; and each DC/DC charging unit 70; the connections not shown for simplicity. DC bus 60 connects each of electrical storage units 50, DC/DC charging units 70 and bi-directional AC/DC converter 40. Bi-directional AC/DC converter 40 is coupled to AC grid 15, a relevant portion of which is supervised by DSO 20. Each DC/DC charging unit 70 is arranged to couple to a PEV 80 and provide a fast charge for the coupled PEV 80. Power sensor 35 is arranged to sense the total power flowing to/from AC grid 15 to/from EVFCS 10, and may be incorporated within bidirectional AC/DC converter 40. Voltage sensor 65 is arranged to detect the voltage level of DC bus 60. Each current sensor 55 associated with a respective electrical storage unit 50 is arranged to sense the amount of current flowing to/from the respective electrical storage unit 50; and each current sensor 55 associated with a respective DC/DC charger 70 is arranged to sense the amount of current flowing to/from the respective DC/DC charger 70. Current sensors 55 may be implemented by Hall effect sensors, fluxgate transformer, sense resistor or a fiber optic current sensor without exceeding the scope.

Power sensor 35 may be implemented by Hall effect sensors, fluxgate transformer, Rogowski coil, current clamp meter, sense resistor or a fiber optic current sensor, in combination with a voltage sensor, without exceeding the scope. Power sensor 35 may be comprised of a plurality of subsensors each arranged for an associated phase of a 3 phase connection. Voltage sensor 65 may be implemented with an analog to digital converter. In one non-limiting embodiment power sensor 35 is implemented by a commercially available power meter model PM135 EH available from SATEC, Ltd., Jerusalem, Israel.

Control circuit 30 may be implemented by a microcontroller, field programmable gate area, computer, or application specific integrated circuit, or a combination of such elements without exceeding the scope. Methods of operation described herein may be performed by control circuit 30 responsive to electronically readable instructions stored on an associated memory.

Figure 1B:
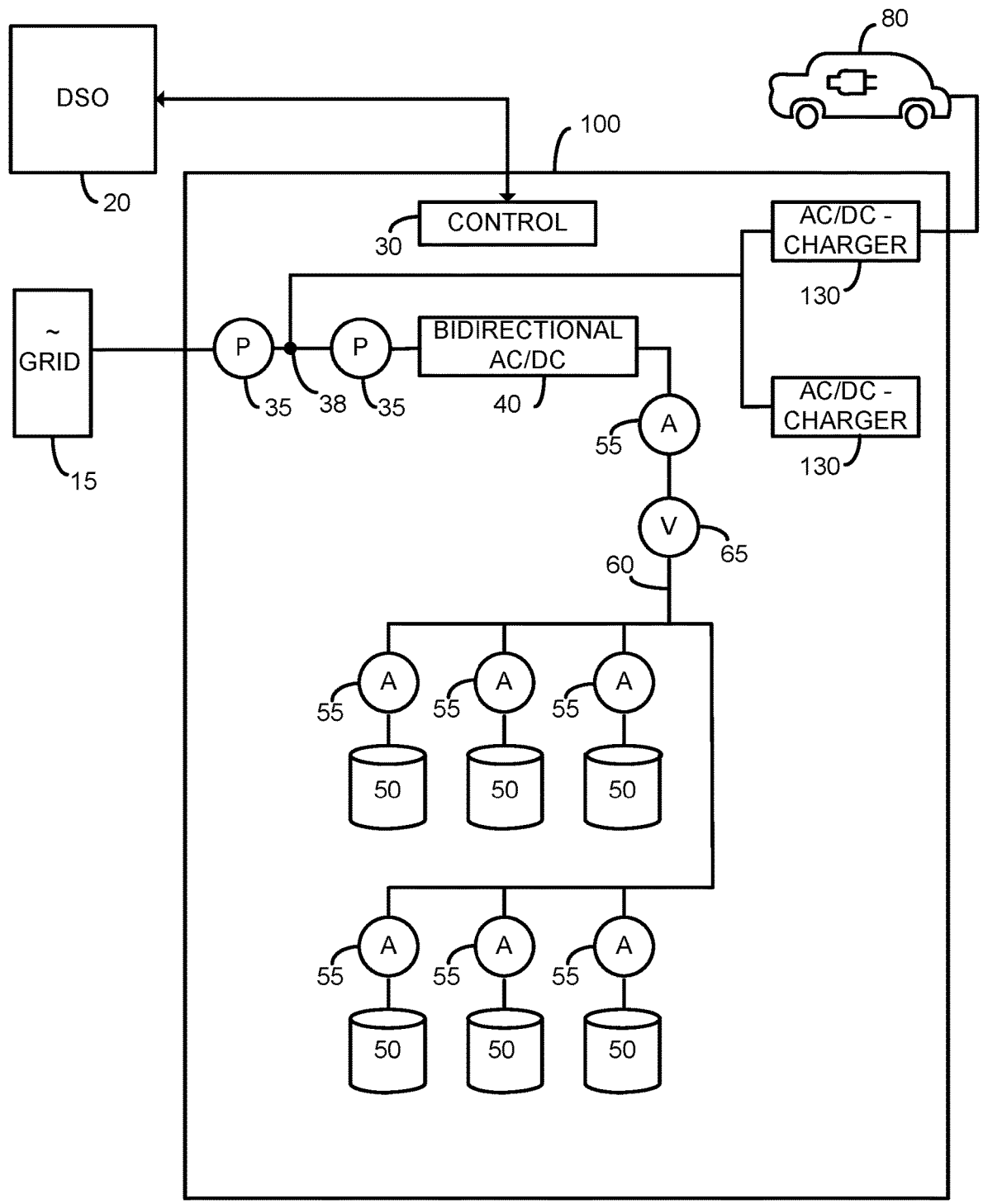
FIG. 1B illustrates a high level block diagram of an embodiment of an electric vehicle fast charging station coupled to an AC grid via a bi-directional AC/DC converter, where an electrical vehicle is charged via an AC/DC charger.

FIG. 1B illustrates a high level block diagram of an embodiment of an EVFCS 100 arranged to provide a fast charge for a PEV 80, where EVFCS 100 is coupled to AC grid 15 via a bi-directional AC/DC converter 40 and in communication with a DSO 20. While a single bi-directional AC/DC converter 40 is illustrated, this is not meant to be limiting in any way, and a plurality of bi-directional AC/DC converters 40 may be provided, operating in parallel, without exceeding the scope. EVFCS 100 comprises: control circuit 30; a plurality of power sensors 35; a bi-directional AC/DC converter 40; a plurality of electrical storage units 50; a plurality of current sensors 55; a DC bus 60; a voltage sensor 65; and a plurality of AC/DC charging units 130. In one non-limiting embodiment each power sensor 35 is implemented by a commercially available power meter model PM135 EH available from SATEC, Ltd., Jerusalem, Israel. Each electrical storage unit 50 may be constituted of magnetically coupled flywheel, without limitation, and as will be described further below may incorporate a servo amplifier in communication with a motor/generator. Each electrical storage unit 50 may have a power converter associated therewith, and optionally a local controller, as known to those skilled in the art (not shown for simplicity) and incorporate a respective current sensor 55. AC grid 15 has a respective power sensor 35 associated therewith, and bi-directional AC/DC converter 40 has a respective power sensor 35 associated therewith and a respective current sensor 55 associated therewith arranged to sense the current flow to/from DC bus 60. DSO 20 is in bidirectional communication with control circuit 30, either over a dedicated connection, or via an Internet link. Control circuit 30 is in communication with: each power sensor 35; bi-directional AC/DC converter 40; each electrical storage unit 50; each current sensor 55, voltage sensor 65; and each AC/DC charging unit 130, the connections not shown for simplicity. DC bus 60 connects each of electrical storage units 50 to bi-directional AC/DC converter 40. Bi-directional AC/DC converter 40 is coupled to AC grid 15, a relevant portion of which is supervised by DSO 20. Each AC/DC charging unit 130 is coupled to the AC side of bi-directional AC/DC converter 40 at a common node 38, and arranged to couple to a PEV 80 and provide a fast charge for the coupled PEV 80. The power sensor 35 associated with AC grid 15 is advantageously coupled between AC grid 15 and common node 38 so as to sense power coming to/from AC grid 15 to/from EVFCS 100. The power sensor 35 associated with bi-directional AC/DC converter 40 is coupled between common node 38 and the AC side of bi-directional AC/DC converter 40 and provides information regarding the amount of AC power input/output by AC/DC converter 40.

Figure 1C:
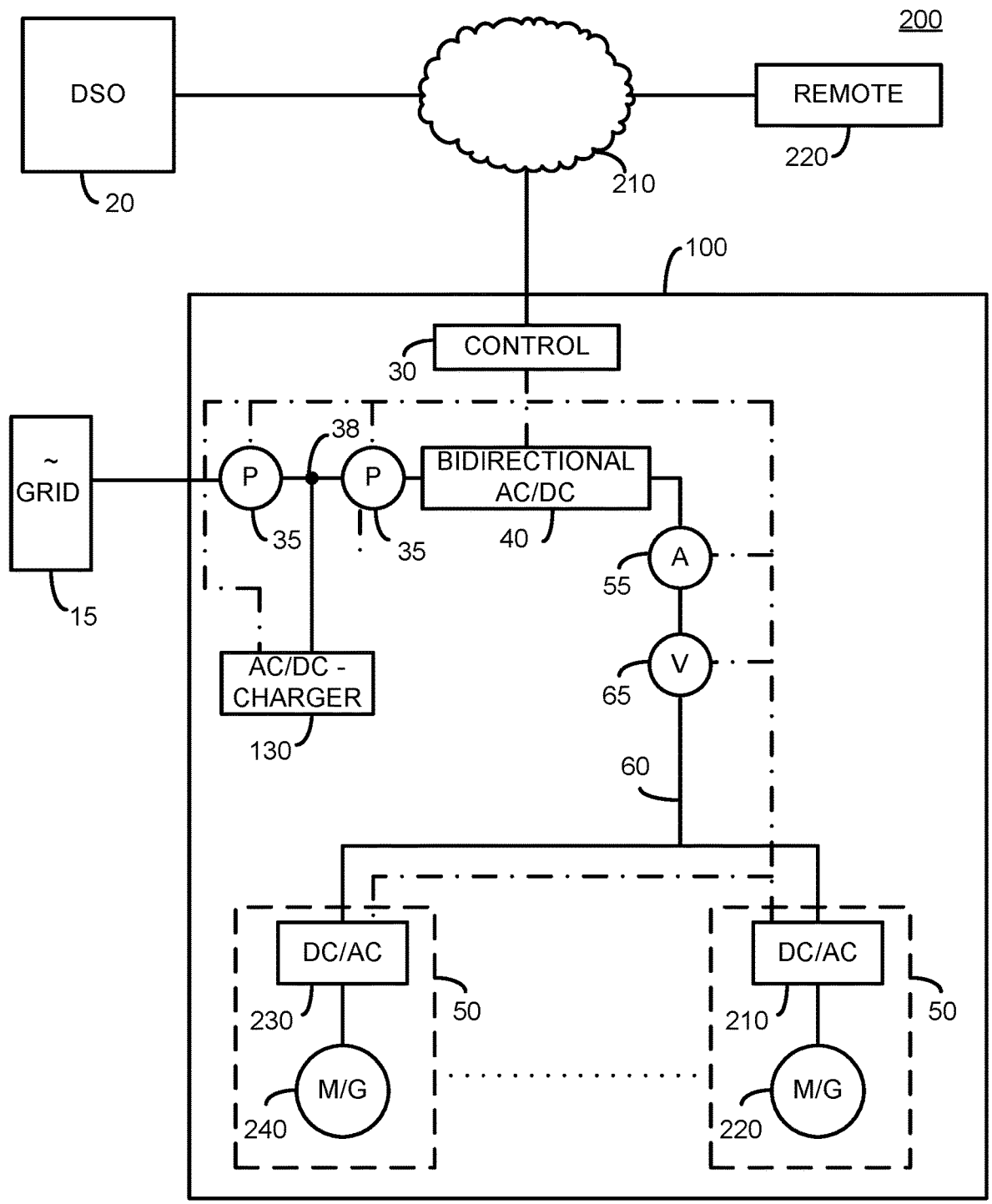
FIG. 1C illustrates further details of an implementation of the electric vehicle fast charging station of FIG. 1B.

FIG. 1C illustrates a high level block diagram of an embodiment of a system 200 utilizing the EVFCS 100 in cooperation with a remote control center 220, further highlighting certain aspects of communication and control in EVFCS 100. System 200 is illustrated comprising EVFCS 100, however this is not meant to be limiting in any way, and EVFCS 100 may be replaced by a station comprising one or more electrical storage units, coupled to an AC grid, with a local load, or a coupleable connection to a load, the electrical energy consumption of which load varies over time, without exceeding the scope. The communication path between control circuit 30 and each power sensor 35; bi-directional AC/DC converter 40; each electrical storage unit 50; each current sensor 55, voltage sensor 65; and each AC/DC charging unit 130 is illustrated with a dot-dash line. An optional connection to AC/DC charging unit 130 is further shown. Each electrical storage unit 50 is illustrated as comprised of a DC/AC converter 230 in communication with a respective motor/generator 240. Control circuit 30 is in communication with each of DSO 20 and remote control center 220 via a communication cloud 210.

In one embodiment, motor/generator 240 is comprised of an annular stator mounted outside a flywheel vacuum chamber, and a vacuum barrier cup housing a motor rotor which motor rotor is mounted on top of a flywheel shaft within the flywheel vacuum chamber. The motor rotor is magnetically coupled to the stator via the vacuum barrier cup as described in the aforementioned International Application Publication WO2014/020593. DC/AC converter 230 may be implemented in a servo-amplifier, such as those sold by Servotronix of Petach Tikva, Israel, and may incorporate therein the respective current sensor 55 (not shown). Bi-directional AD/DC converter 40 may be implemented by a converter sold by SolarEdge Technologies, Inc., of Freemont, Calif., and may comprise therein the respective current sensor 55 and power sensor 35. Remote control center 220 provides for remote control of multiple EVFCS 100 from a single control location.

In order to provide a fast charge to a random number of PEVs 80, without disturbing the AC grid by presenting sharply varying loads, each of EVFCS 10 and EVFCS 100 stores electrical energy in electrical storage units 50 whenever the demand from PEVs 80 coupled thereto is less than a predetermined amount, thus providing a fixed load to AC grid 15. Advantageously, by providing a bi-directional conversion between AC grid 15 and EVFCS 10, 100 power may be provided from EVFCS 10, 100 to AC grid 15, when AC grid 15 is experiencing a temporary over-demand condition.

Figure 2A:
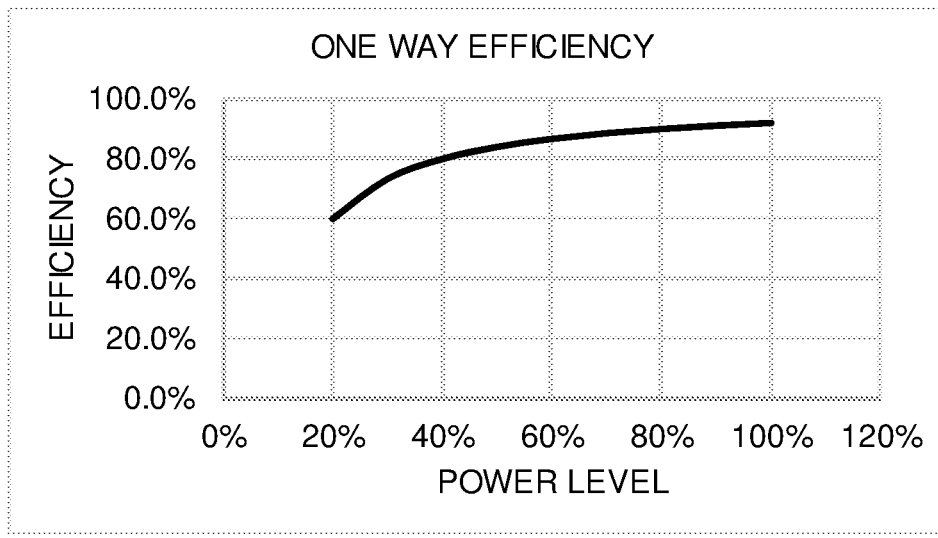
FIG. 2A illustrates a graph of the efficiency a flywheel embodiment of an electrical storage unit, as a function of power flow to/from the flywheel electrical storage unit.

In order to efficiently operate EVFCS 10, 100, the storage abilities of the selected electrical storage unit 50 were analyzed by the inventors. FIG. 2A illustrates a graph of the efficiency a flywheel embodiment of an electrical storage unit, as a function of power flow to/from the flywheel electrical storage unit 50, wherein the x-axis illustrates power being drawn from, or provided to, electrical storage unit 50 as a percentage of a maximum amount of power which may be handled by electrical storage unit 50 and the y-axis illustrates efficiency of the motor plus driver of such flywheel as a percentage of a theoretical maximum efficiency. As a can be seen efficiency increases monotonically with power level, with efficiency of above 80% experienced down to a power level of about 30%. Below about 20% of the maximum power level efficiency drops off rapidly.

Figure 2B:
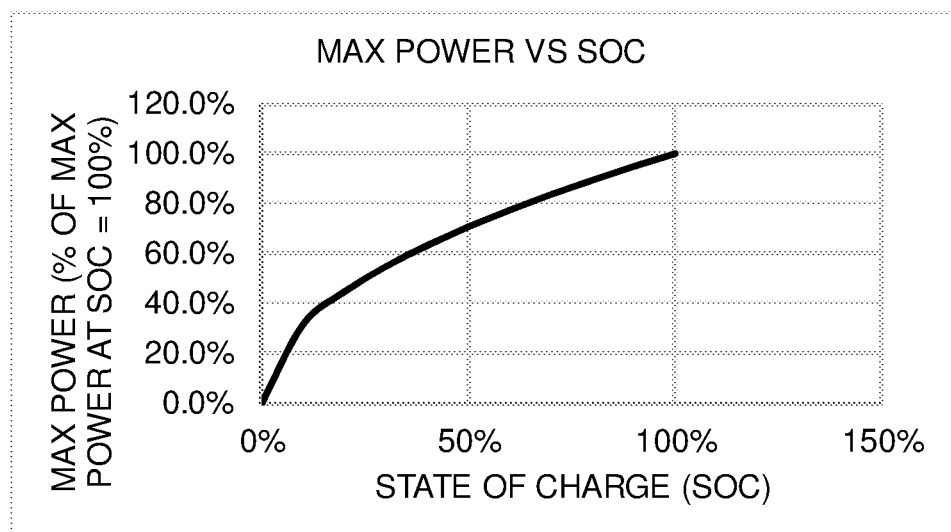
FIG. 2B illustrates a graph of maximum power available from a flywheel embodiment of an electrical storage unit as a function of the state of charge.

FIG. 2B illustrates a graph of maximum power available from each flywheel electrical storage unit 50 as a function of the state of charge, where the x-axis represents the state of charge of the device in percentage of maximum and the y-axis represents the maximal available power as a percentage of the total available power. Thus as the state of charge of each flywheel electrical storage unit 50 increases, the amount of power available increases. State of charge of a flywheel is a function of the rotational speed and thus can be easily monitored. As a can be seen maximum available power increases monotonically with increasing state of charge, with a sharp drop off when the state of charge falls below about 10%. As the flywheel discharges its ability to deliver power decreases due to the fact that the power is linearly dependent on the EMF voltage of the motor, which itself is linearly dependent on the speed of the flywheel. The speed of the flywheel also relates to the remaining capacity of the flywheel. In certain embodiments, the energy storage capacity of flywheel electrical storage unit 50 is 3 KWH, and the maximum power is 15 KW.

As can be seen from FIG. 2A however, high efficiency is achieved by drawing power near the maximum available power from each flywheel electrical storage unit 50. Thus, utilizing power from multiple flywheel electrical storage units 50 by simply dividing the total required power equally among the flywheel electrical storage units 50 results in an inefficient solution.

As indicated above, EVFCS 10, 100 are bidirectionally coupled to AC grid 15, and in bidirectional communication with DSO 20. In the event that DSO 20 experiences a demand in excess of plan, DSO 20 preferably send a request for a predetermined amount of power to control circuitry 30. Control circuitry 30 must balance the request from DSO 20 with the potential demand from PEV 80, which is unrelated to demand from DSO 20. Remote control center 220 is operative to manage demands over a plurality of EVFCSs 10, 100 so as to achieve an improved financial result. It is to be noted that a demand from DSO 20 is however preferably treated as a high priority, since in certain situations the financial rewards for supplying DSO 20 are significantly greater, pre KWH, than the rewards for charging PEV 20.

EVFCS 10, 100 is faced with 2 different, uncorrelated demands: the demand from PEVs 80; and any request from DSO 20. As indicated above, the demand from PEVs 80, which are coupleable to EVFCS 10, 100, vary over time. Mathematically, the total amount of electrical storage available at EVFSC 10, 100, as a function of time, may be split among: a percentage reserved for PEVs 80, denoted as C % (t); an amount reserved to supply requests from DSO 20, denoted as $BC_{charge}$ % (t) and an additional amount reserved for energy absorption from AC grid 15 responsive to requests from DSO 20, denoted as $BC_{discharge}$ % (t). The sum of the 3 terms: C % (t), $BC_{charge}$ % (t); and $BC_{discharge}$ % (t) for any given time (t) is 100%. The above amounts are allocated values and not necessarily utilized, or available, values. For example, in the event that we have allocated 70% for C % (t), this means that the system controller 30 can use up to 70% of the total energy capacity of EVFSC 10, 100 for the purpose of EV charging. When the charging is completed it is clear that the 70% is not available any more until the unit is recharged, but the allocation remains unchanged.

In order to determine the optimal response to such a situation, we minimize the value of unmet opportunities which can be expressed as:

$$USSR(t) = A(t) \cdot \Sigma E_{BCcharge} \cdot (1 - SL_{BCS}) + B(t) \cdot \Sigma E_{ev} \cdot (1 - SL_{ECV}) + C(t) \cdot \Sigma E_{BCdischarge} \cdot (1 - SL_{ECV})$$  EQ. 1 where:

A(t) is the economic value of supplying requests from DSO 20, which may be expressed in Euro/kWh;

$E_{BC}$ is the energy requested by all connected DSOs 20 which may be expressed in kWh;

$SL_{BCS}$ is the fraction of the total $E_{BC}$ that was met by the individual EVFCS 10, 100;

B(t) is the economic value of supplying requests from the arriving PEVs 80, which may be expressed in Euro/kWh;

$E_{ev}$ is the energy requested by the arriving PEVs 80 which may be expressed in kWh; and $SL_{ECV}$ is the fraction of the total $E_{ev}$ that was met by the individual EVFCS 10, 100;

C(t) is the economic value of supplying requests from DSO 20 to absorb energy, which may be expressed in Euro/kWh;

$E_{BCdischarge}$ is the energy absorption request by DSO 20, which may be expressed in kWh; and $SL_{BCS}$ is the fraction of the total $E_{BCdischarge}$ that was met by the individual unit 10,100.

EQ. 1 defines a value for unmet demand, and thus minimizing the equation provides an optimal economic value.

Figure 3:
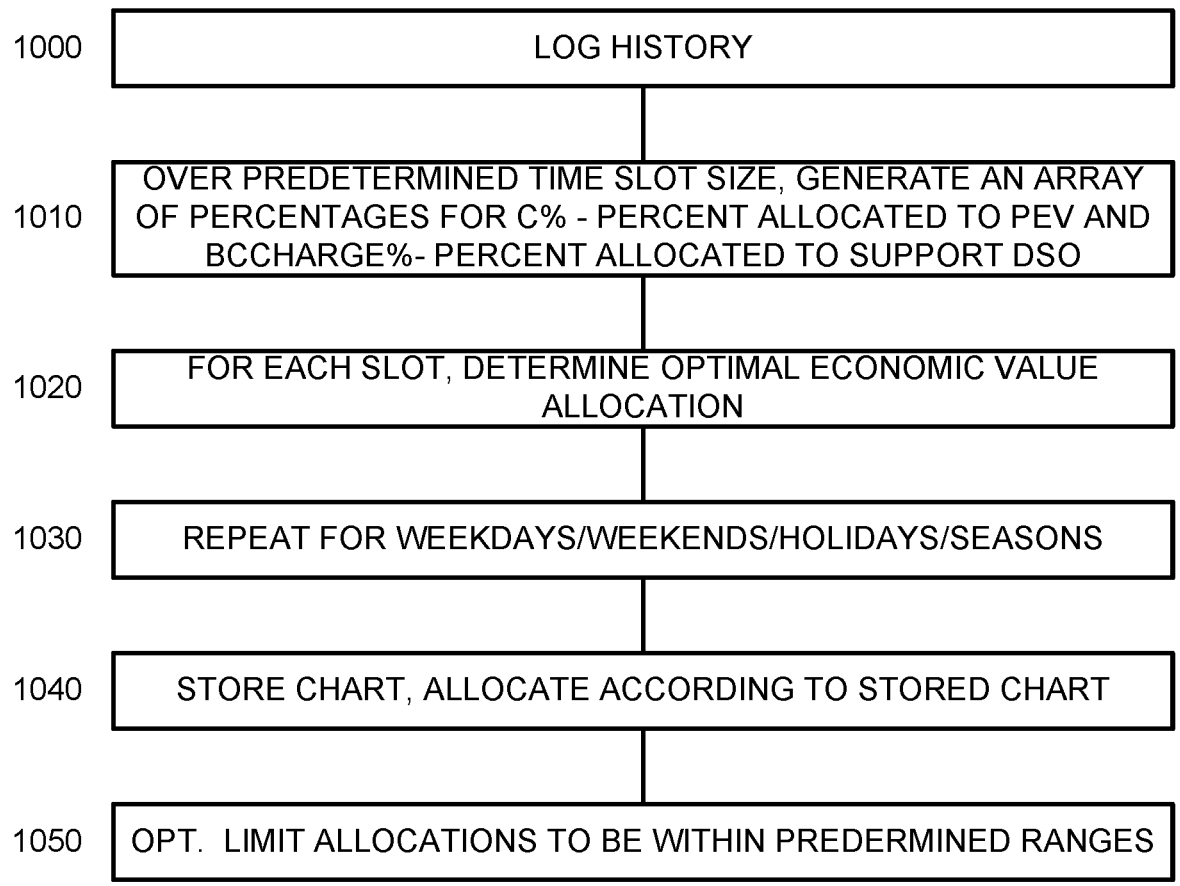
FIG. 3 illustrates a high level flow chart of the operation of a control circuit of any of the embodiments of FIGS. 1A-1C of a method of off-line optimization.

In one embodiment, as illustrated in FIG. 3, off-line optimization is performed by control circuit 30. In state 1000, a history is logged, and divided into predetermined time slots. In stage 1010, for each historical time slot, the value of USSR is calculated for an array of values of C % (t) and $BC_{charge}$ % (t) and $BC_{discharge}$ % (t). In stage 1020 the minimal value for USSR for the historical time slot is calculated, and used as a starting point for a steepest decent optimization algorithm to find the optimal value. In optional stage 1030, the above is repeated for separately for weekdays, weekends, holidays and over the various seasons. In stage 1040, the chart of stage 1020-1030 is stored and utilized going forward to allocate energy responsive to demand from DSO 20 and PEVs 80. Thus, 100% of the stored energy capacity of EVFCSs 10,100 is allocated in accordance with an expected maximal economic value between DSO 20 and PEVs 80.

The above has been described in an embodiment where no limitations are provided to C % (t) and $BC_{charge}$ % (t) and $BC_{discharge}$ % (t), however this is not meant to be limiting in any way. In another embodiment each of C % (t) and $BC_{charge}$ % (t) and $BC_{discharge}$ % (t) are limited to only allow a predetermined range of acceptable values, as illustrated in optional stage 1050. Such a limitation will prevent allocation of energy to DSO 20 to the exclusion of PEV 80. As indicated above, the above has been particularly described in relation to an EVFCS, however this is not meant to be limiting in any way. EVFCS may be replaced by a station comprising one or more electrical storage units, coupled to an AC grid, with a local load, or a coupleable connection to a load, the electrical energy consumption of which load varies over time, without exceeding the scope.

Referring back to FIGS. 2A, 2B, the inventors have realized that in order to efficiently support a load with a plurality of flywheel based electrical storage units 50, it is important to maintain a high percentage power load to each electrical storage unit 50. Thus, simply dividing any demand equally among flywheel based electrical storage units 50 results in a suboptimal solution.

Figure 4:
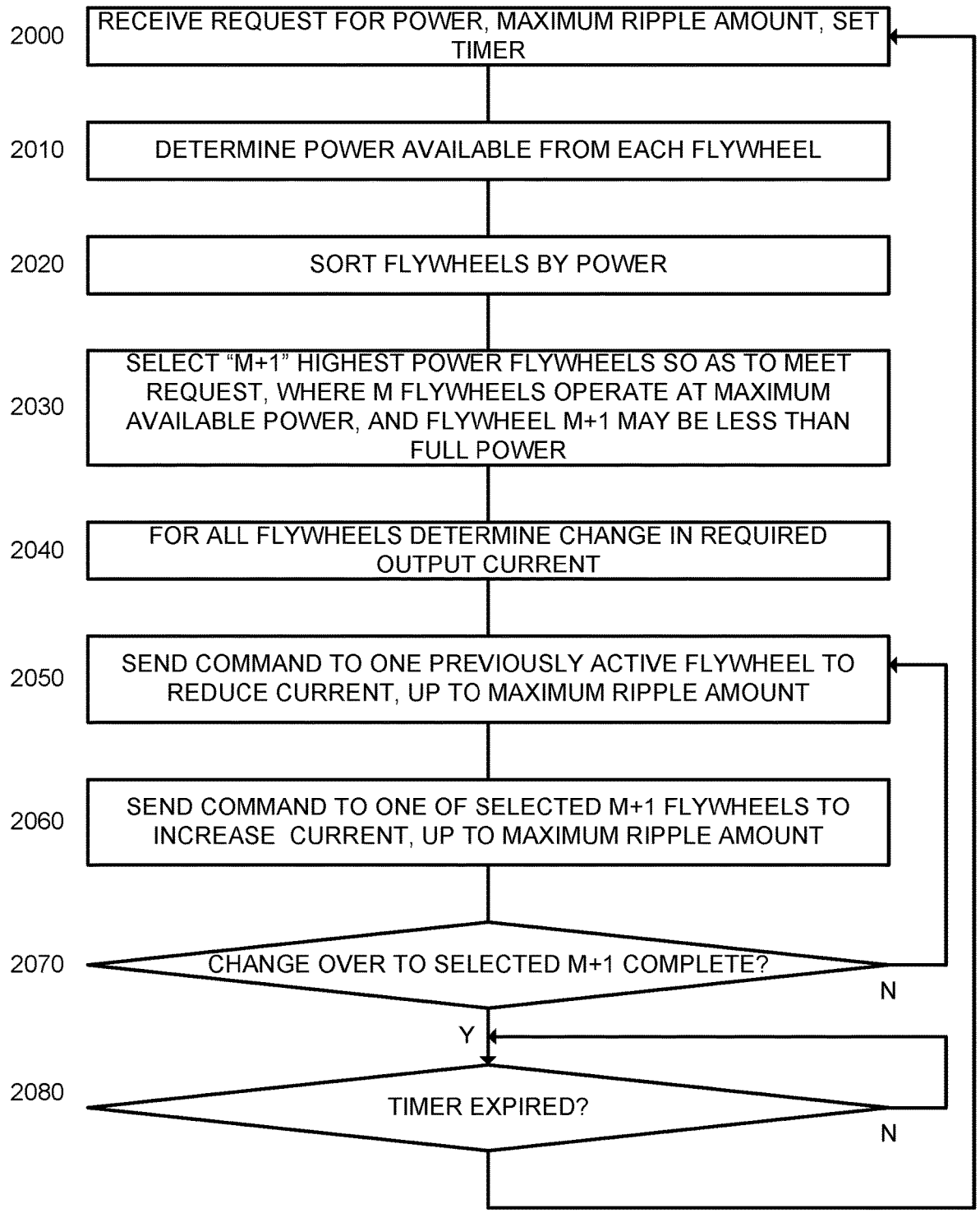
FIG. 4 illustrates a high level flow chart of the operation of a control circuit of any of the embodiments of FIGS. 1A-1C to provide electrical power to either the AC grid or to PEVs.

FIG. 4 illustrates a high level flow chart of the operation of control circuit 30 of a station, to provide electrical energy from the plurality of flywheel based electrical storage units 50 to either AC grid 15, responsive to a request from DSO 20, or to PEVs 80 through DC/DC charging units 70, or AC/DC charging units 130, respectively, PEVs 80 representing an embodiment of a coupleable time varying load. In stage 2000 a request for power is received by control circuit 30 with an associated maximum amount of ripple, with the request power denoted "Preq", and the maximum amount of ripple denoted "AP". Preq may be either positive or negative value, depending if we need to perform charging or discharging of the flywheel based electrical storage units 50. AP may be predetermined for the system, or may be supplied along with the request, without limitation. Different ripple amounts may be utilized for each demand, for example through DC/DC charging units 70, or AC/DC charging units 130, respectively may have a first maximum ripple amount associated therewith and AC grid 15 may have a different ripple amount associated therewith. A timer is further set to ensure that the operation of FIG. 4 is repeated regularly during operation. In one embodiment, the timer of stage 2000 is set to 1 minute.

In stage 2010, all of the flywheel based electrical storage units 50 are scanned to determine the presently available maximum power available from each of the N associated flywheel based electrical storage units 50. Mathematically, for a flywheel based electrical storage unit 50, the maximum amount of available power from flywheel "j" at a specific point in time is determined as:

$$P\max_j = I\max_j * Ke_j * \omega_j * 0.87$$  EQ. 2

Where $Imax_j$ is the maximal peak current value for flywheel "j", $Ke_j$ is the motor generator EMF constant for flywheel "j" and $\omega_j$ is the present flywheel speed in RPM for flywheel "j". Thus, $Pmax_j$ varies with $\omega_j$ since for a given flywheel based electrical storage unit 50, since both $Imax_j$ and $Ke_j$ are constant.

In stage 2020, the flywheels are sorted in descending order of power. It is to be understood that stage 2020 is not strictly required, and is described herein for ease of understanding. In stage 2030, M+1 flywheel based electrical storage units 50 are selected in descending order of power, such that:

$$\Sigma_1^{M+1} Pmax_j \geq Preq > \Sigma_1^M Pmax_j \qquad \text{EQ. 3}$$

It is to be understood from EQ. 3 that M flywheels are being selected to operate at their respective Pmax, and flywheel M+1 may operate at less than Pmax. The current required from each of the M+1 selected flywheel based electrical storage units 50 is determined. It is apparent from EQ. 3 that for flywheel based electrical storage units 50 1 to M, the current I that will be drawn therefrom will be equal to Imax for the respective flywheel based electrical storage unit 50, and the current I that will be drawn from flywheel based electrical storage unit M+1 may be less than the respective Imax.

In order to avoid exceeding the predetermined maximum ΔP of stage 2000, in stage 2040 we determine for each flywheel based electrical storage unit 50 the expected change in current, denoted "$\Delta I_j$". Some of flywheel based electrical storage units 50 which have up to now been supplying power, may now have their power draw disabled, whereas the M+1 selected flywheel based electrical storage units 50 will now receive enabling commands. The changes in current may be either positive or negative. Utilizing EQ. 2 we convert ΔP of stage 2000 into a maximum allowed ripple current, denoted "ΔImax".

In stage 2050, control circuit 30 sends a reduce current command to one of the flywheel based electrical storage units 50 of stage 2040 which has been determined to have a negative $\Delta I_j$ so as to reduce its current by no more than ΔImax. In the event that $\Delta I_j$ for the flywheel based electrical storage units 50 having a negative $\Delta I_j$ is less than ΔImax, control circuit 30 sends the command to reduce it by $\Delta I_j$.

In stage 2060, control circuit 30 sends an increase current command to one of the flywheel based electrical storage units 50 of stage 2040 which has been determined to have a positive $\Delta I_j$ so as to increase its current by no more than ΔImax. In the event that $\Delta I_j$ for the flywheel based electrical storage units 50 having a positive $\Delta I_j$ is less than ΔImax, control circuit 30 sends the command to increase it by $\Delta I_j$.

In stage 2070, the changes in stage 2050-2060 are compared with the determined changes of stage 2040. In the event that the changes of stage 2040 are not completed, control returns to stage 2050.

In the event that they are complete, in stage 2080 the timer of stage 2000 is checked. In the event that the timer has not expired stage 2080 is repeated. In the event that the timer of stage 2000 has expired, control returns to stage 2000.

While the term calculate is used herein, it does not necessarily require mathematical calculations in real time, and the use of a look up table with pre-calculated values is specifically included herein wherever the term calculate is used. Any method of determination, is thus meant to be included.

Figure 5:
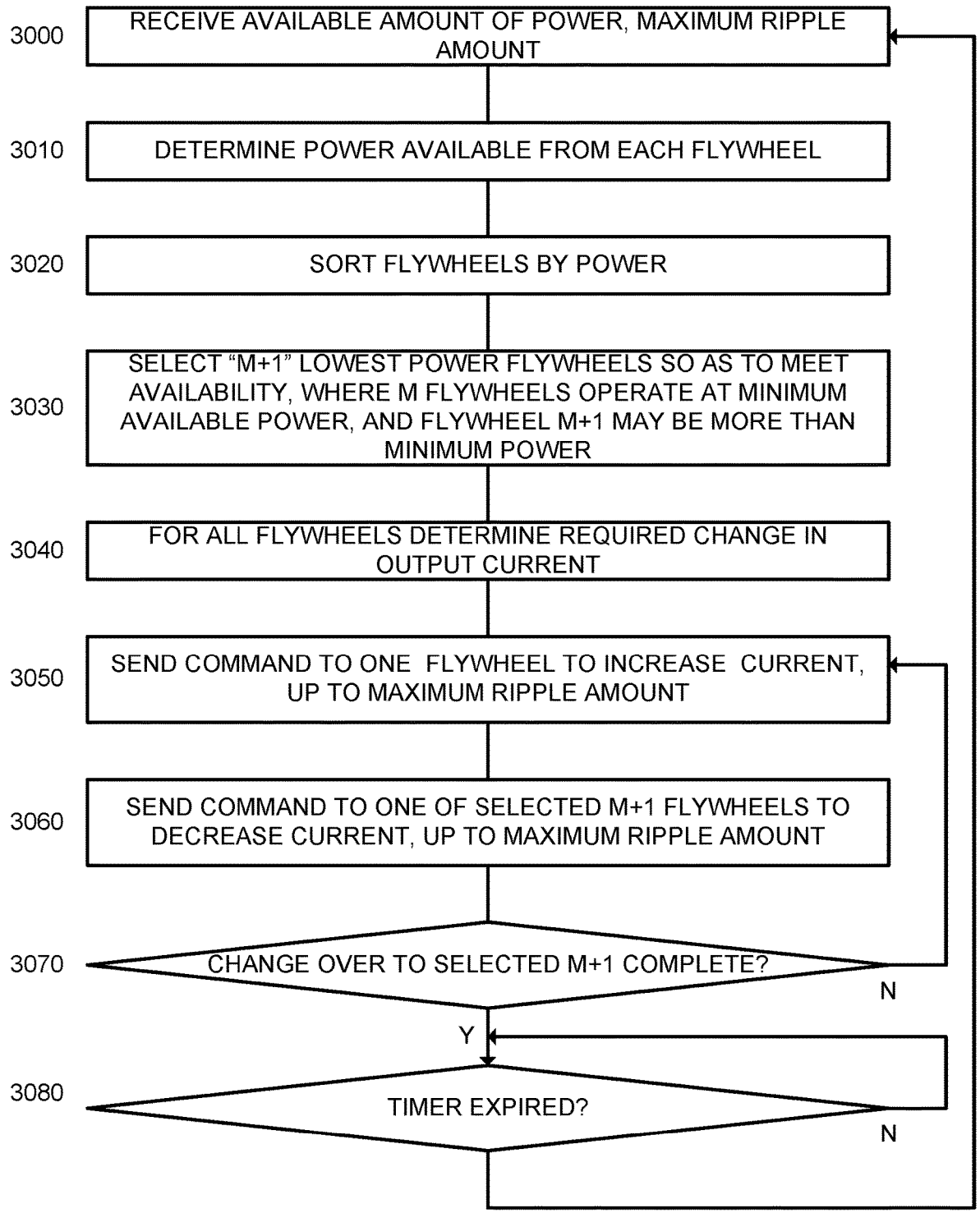
FIG. 5 illustrates a high level flow chart of the operation of a control circuit of any of the embodiments of FIGS. 1A-1C to draw electrical power from the AC grid while its PEV charging demand is less than a contracted draw amount.

FIG. 5 illustrates a high level flow chart of the operation of control circuit 30 to draw electrical energy from AC grid 15 to flywheel based electrical storage units 50, responsive to the difference between an allocated amount of power draw and the needs of PEV 80, i.e. in a situation where EVFCS 10, 100 is contracted to, or allowed to, take a predetermined amount of power while its PEV charging demand is less than that amount. As indicated above, the operation is being particularly described in relation to an EVFCS 10, 100, however this is not meant to be limiting in any way. EVFCS 10, 100 may be replaced by a station comprising one or more electrical storage units, coupled to an AC grid, with a local load, or a coupleable connection to a load, the electrical energy consumption of which load varies over time, without exceeding the scope.

In stage 3000 control circuit 30 recognizes the imbalance and determines the available amount of power to store with an associated maximum amount of ripple, with the available amount of power denoted "Pavail" and the maximum amount of ripple denoted "ΔP". ΔP may be predetermined for the system, or may be supplied periodically by DSO 20, without limitation. A timer is further set to ensure that the operation of FIG. 5 is repeated regularly during operation. In one embodiment, the timer of stage 3000 is set to 1 minute.

In stage 3010, all of the flywheel based electrical storage units 50 are scanned to determine the presently available maximum power available from each of the N associated flywheel based electrical storage units 50, as described above in relation to EQ. 2.

In stage 3020, the flywheels are sorted in ascending order of power. It is to be understood that stage 3020 is not strictly required, and is described herein for ease of understanding. In stage 3030, M+1 flywheel based electrical storage units 50 are selected in ascending order of power, such that:

$$\Sigma_1^{M+1} Pmax_j \geq Pavail > \Sigma_1^M Pmax_j \qquad \text{EQ. 4}$$

It is to be understood from EQ. 4 that M flywheels are being selected to operate at their respective Pmax, and flywheel M+1 may operate at less than Pmax. The current required being supplied to each of the M+1 selected flywheel based electrical storage units 50 is determined. It is apparent from EQ. 4 that for flywheel based electrical storage units 50 1 to M, the current I that will be input thereto will be equal to Imax for the respective flywheel based electrical storage unit 50, and the current I that will be input to flywheel based electrical storage unit M+1 will be less than the respective Imax.

In order to avoid exceeding the predetermined maximum ΔP of stage 3000, in stage 3040 we determine for each flywheel based electrical storage unit 50 the expected change in current, denoted "$\Delta I_j$". The changes in current may be either positive or negative. Utilizing EQ. 2 we convert ΔP of stage 2000 into a maximum allowed ripple current, denoted "ΔImax".

In stage 3050, control circuit 30 sends an increase current command to one of the flywheel based electrical storage units 50 of stage 3040 which has been determined to have a positive $\Delta I_j$ so as to increase its current by no more than ΔImax. In the event that $\Delta I_j$ for the flywheel based electrical storage units 50 having a positive $\Delta I_j$ is less than ΔImax, control circuit 30 sends the command to increase it by $\Delta I_j$.

In stage 3060, control circuit 30 sends a decrease current command to one of the flywheel based electrical storage units 50 of stage 3040 which has been determined to have a negative $\Delta I_j$ so as to decrease its current by no more than ΔImax. In the event that $\Delta I_j$ for the flywheel based electrical storage units 50 having a negative $\Delta I_j$ is less than ΔImax, control circuit 30 sends the command to decrease it by $\Delta I_j$.

In stage 3070, the changes in stage 3050-3060 are compared with the determined changes of stage 3040. In the event that the changes of stage 3040 are not completed, control returns to stage 3050.

In the event that they are complete, in stage 3080 the timer of stage 3000 is checked. In the event that the timer has not expired stage 3080 is repeated. In the event that the timer of stage 3000 has expired, control returns to stage 3000.

Figure 6:
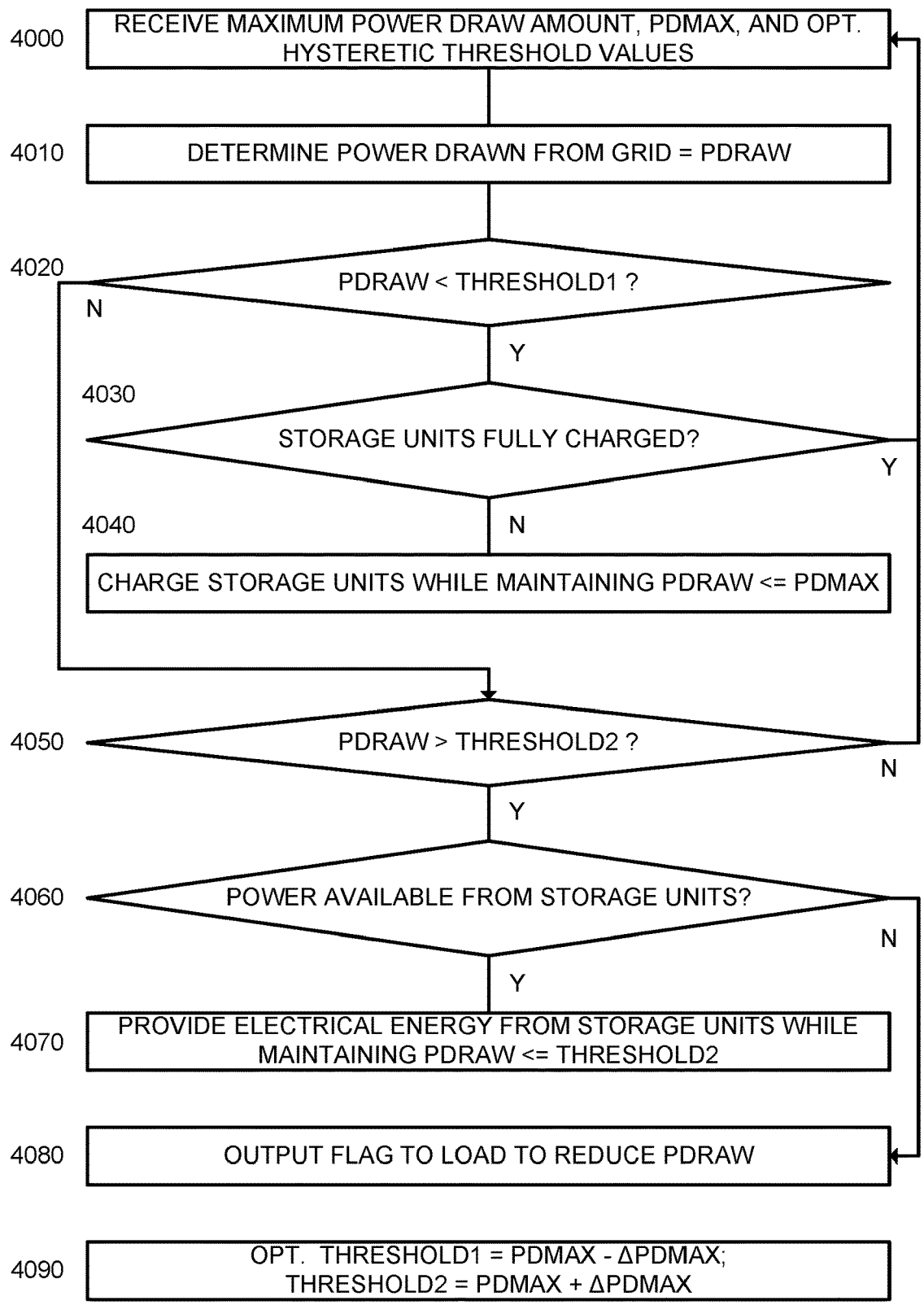
FIG. 6 illustrates a high level flow chart of the operation of a control circuit of any of the embodiments of FIGS. 1A-1C to maintain the electrical power drawn from the AC grid within a predetermined range.

FIG. 6 illustrates a high level flow chart of the operation of a control circuit of any of the embodiments of FIGS. 1A-1C to maintain the electrical energy drawn from the AC grid within a predetermined range. In stage 4000, control circuit 30 receives a maximum power draw value, denoted PDMAX, optionally with a hysteretic threshold values. In one embodiment, as shown at stage 4090, the hysteretic threshold values are defined as evenly defined as higher, and lower than, than PDMAX, respectively, by an amount ΔPDMAX. In such an embodiment PDMAX represents the maximum power that may be drawn by the station, such as EVFCS 10, 100, from AC grid 15 within a threshold window—i.e. PDMAX is a target value, for which a range of +/−ΔPDMAX may be tolerated. This has been explained with a single hysteretic threshold ΔPDMAX, however this is not meant to be limiting in any way. Different threshold values may be provided for the threshold above PDMAX and the threshold below PDMAX, without exceeding the scope. The values PDMAX, higher and lower thresholds, and/or ΔPDMAX may be fixed at initial installation, or may be changed over time subject to information received from DSO 20. As indicated above, the use of hysteretic threshold is optional.

In stage 4010, control circuit 30 determines the power drawn from AC grid 15 as PDRAW. In the embodiment of EVFCS 10 PDRAW may be input from power sensor 35 and in the embodiment of EVFCS 100 PDRAW may be input from the power sensor 35 associated with AC grid 15.

In stage 4020 PDRAW is compared with a value THRESHOLD1, which in one embodiment is set to be equal to PDMAX−ΔPDMAX. In the event that PDRAW is less than THRESHOLD1, in stage 4030 electrical storage units 50 associated with control circuit 30 are polled to determine if each of electrical storage units 50 are fully charged. In the event that at least one electrical storage unit 50 is not fully charged, in stage 4040 control circuit 30 enables the at least one not fully charged electrical storage unit to draw electrical energy from AC grid 15, thus increases the electrical energy stored thereon. Control circuit 30 ensures that electrical storage units 50 are charged at a rate so as to ensure that PDRAW, which now includes power draw for charging at least one electrical storage unit 50, does not exceed PDMAX. In the event that in stage 4030, all of the electrical storage units 50 are fully charged, EVFCS 10, 100 is unable to increase its power draw, and stage 4000 is repeated. THRESHOLD1 thus represents a lower threshold value, and when the PDRAW is less than THRESHOLD1 additional electrical energy can be drawn from AC grid 15 to charge at least one electrical storage unit 50.

In the event that in stage 4020, PDRAW is not less than THRESHOLD1, in stage 4050 PDRAW is compared with THRESHOLD2, which in one embodiment is equal to PDMAX+ΔPDMAX. If PDRAW is not greater than THRESHOLD2, then PDRAW is within the hysteretic window presented by THRESHOLD1 and THRESHOLD2 and stage 4000 is repeated. In such an embodiment, the maximum amount that may be drawn is allowed to temporarily exceed PDMAX provided that the amount drawn does not exceed THRESHOLD2, it being understood that PDMAX is a setting value, and not necessarily a physical absolute maximum. As will be understood by those skilled in the art, THRESHOLD2>THRESHOLD1. THRESHOLD2 thus represents a higher threshold value, and when the PDRAW is greater than THRESHOLD2 electrical energy drawn from AC grid 15 should be reduced, preferably by drawing electrical energy from at least one electrical storage unit 50.

In the event that in stage 4050, PDRAW is greater than THRESHOLD2, i.e. an overdraw condition is experienced, in stage 4060 electrical storage units 50 associated with control circuit 30 are polled to determine if at least one electrical storage units 50 is capable of supplying electrical energy. In the event that in stage 4060 at least one electrical storage units 50 is capable of supplying electrical energy, in stage 4070 electrical energy is provided for a load of EVFCS 10, 100 from the at least one electrical storage units 50 capable of supplying electrical energy, while monitoring PDRAW so as to ensure that PDRAW is less than, or equal to, THRESHOLD2. Such a load may be presented by DC/DC charging unit 70 or AC/DC charging unit 130 having a connected vehicle. Advantageously, no communication with DC/DC charging unit 70 or AC/DC charging unit 130 is required.

In the event that in stage 4060 none of electrical storage units 50 is capable of supplying electrical energy, in stage 4080 control circuit 30 outputs a flag to indicate a need to reduce PDRAW. Such a flag may signal an operator to disconnect at least one PEV 80. Alternately, in the event that a simple 1 bit communication is provided between control circuit 30 and DC/DC charging unit 70 or AC/DC charging unit 130, control circuit 30 may disable one or more DC/DC charging unit 70 or AC/DC charging unit 130, respectively, until PDRAW is reduced to below, or equal to, THRESHOLD2. Control circuit 30 may then continue to monitor PDRAW, and in the event that disabling a single DC/DC charging unit 70 or AC/DC charging unit 130, respectively, has not reduced PDRAW to below, or equal to, THRESHOLD2, additional DC/DC charging unit 70 or AC/DC charging unit 130 may be disabled. Power is re-enabled only after PDRAW is reduced to below THRESHOLD1.

Alternately, in the event that more detailed control of DC/DC charging unit 70 or AC/DC charging unit 130 is available, power draw may be reduced by commanding the respected DC/DC charging unit 70 or AC/DC charging unit 130 to reduce its draw by a predetermined amount, or to maintain its draw below a predetermined value.

Figure 7A:
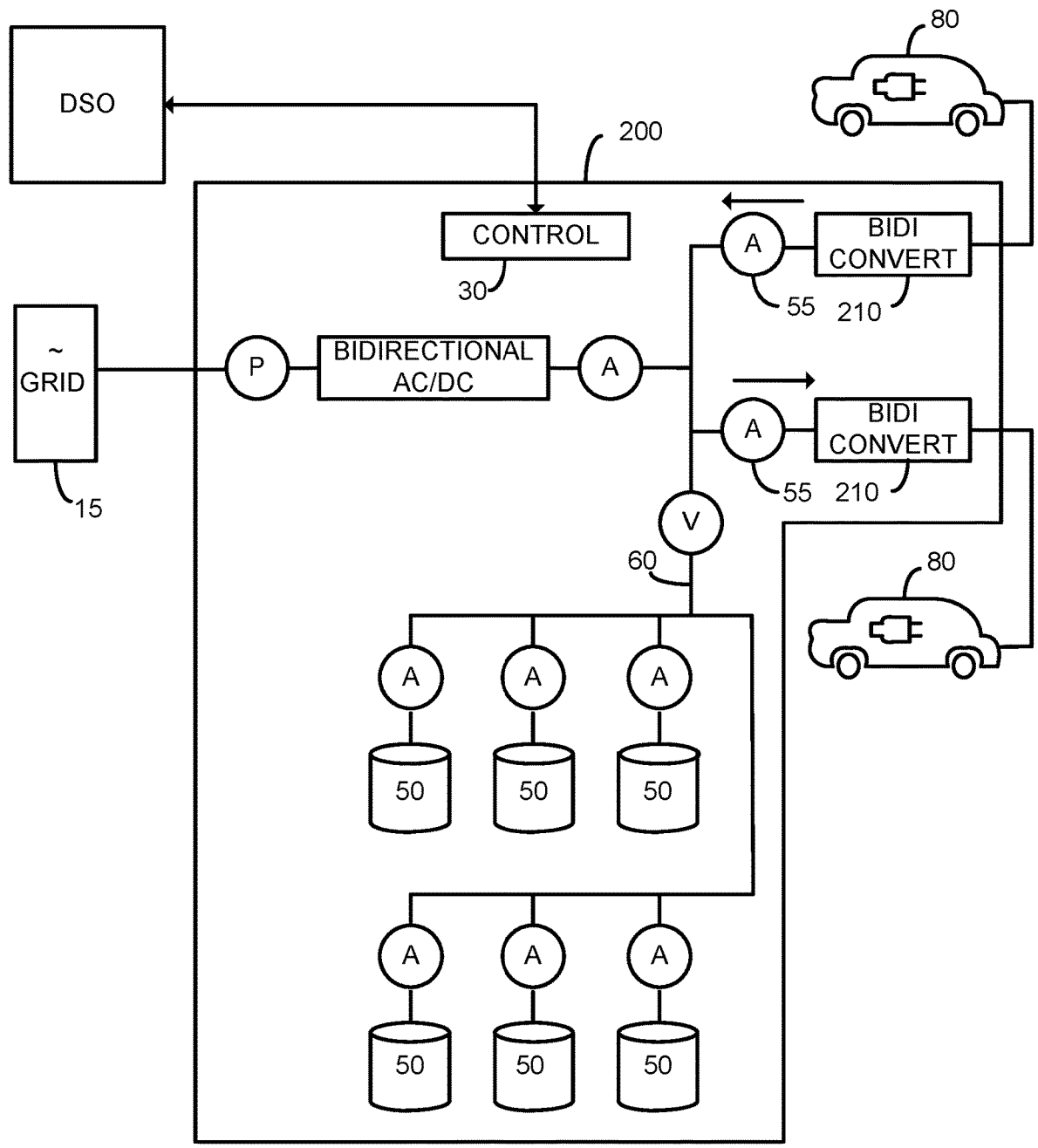
FIG. 7A illustrates a high level block diagram of an embodiment of an electric vehicle fast charging station coupled to an AC grid via a bi-directional AC/DC converter, where a first electrical vehicle is arranged to charge a second electrical vehicle.
Figure 7B:
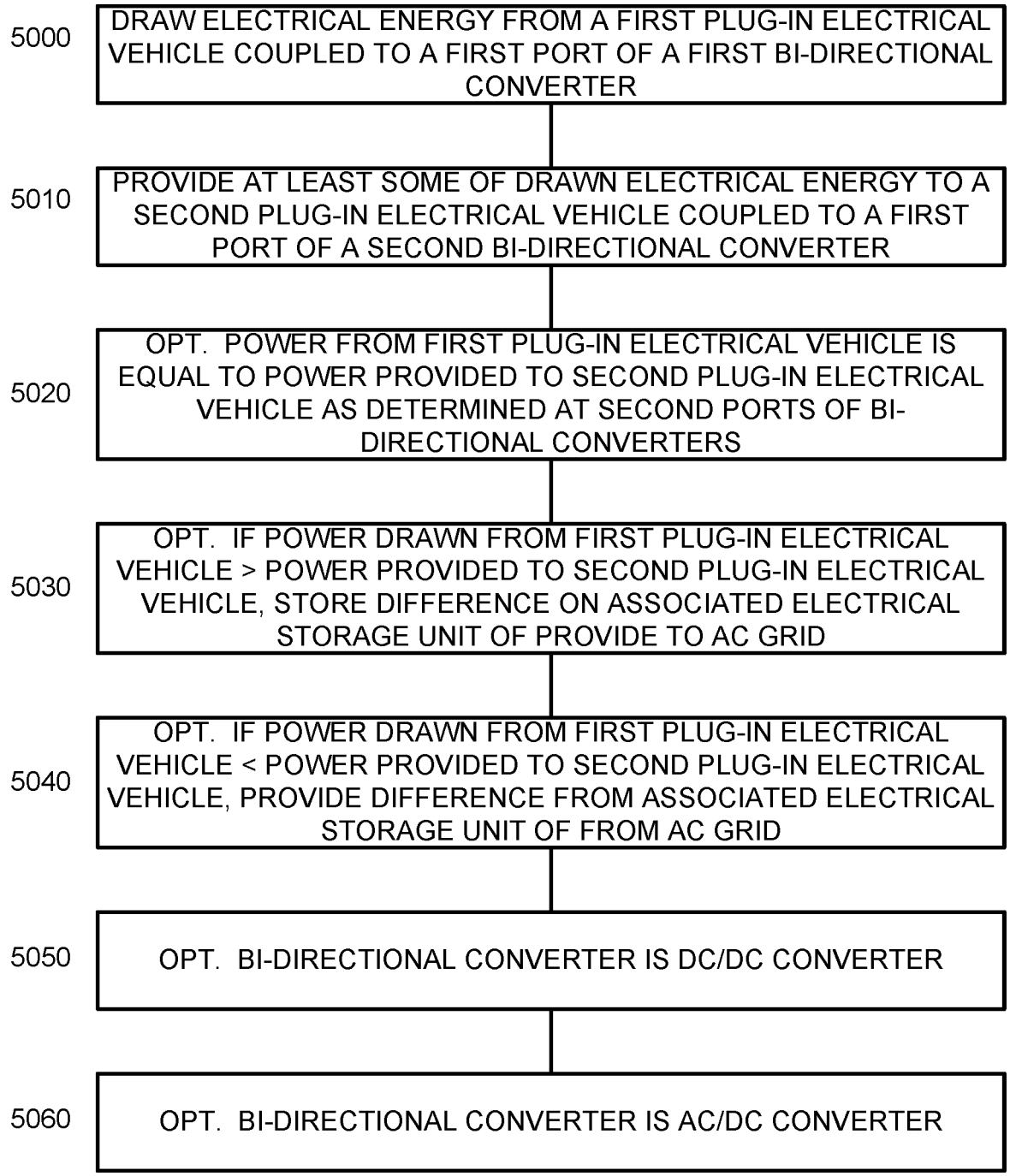
FIG. 7B illustrates a high level flow chart of a method of operation of the arrangement of FIG. 7A to provide plug-in vehicle to plug-in vehicle charging.

FIG. 7A illustrates a high level block diagram of an embodiment of an electric vehicle fast charging station 200, where a first electrical vehicle is arranged to charge a second electrical vehicle. Electric vehicle fast charging station 200 is arranged as described above in relation to electric vehicle fast charging station 10, with the exception that DC/DC charging units 70 are replaced with bi-directional converters 210. FIG. 7B illustrates a high level flow chart of a method of operation of the arrangement of FIG. 7A to provide plug-in vehicle to plug-in vehicle charging, the figures being described together. FIGS. 7A-7B are particularly described in relation to electrical vehicles, however this is meant as an illustrating embodiment, and is not meant to be limiting in any way.

Electric vehicle fast charging station 200 may operate as described above in relation to electric vehicle fast charging station 100, and in addition may provide electrical energy drawn from a first PEV 80 to a second PEV 80. First PEV 80 is configured with the ability to provide electrical energy via its charging port to a first port of the respective bi-directional DC/DC converters 210 to which it is connected. Such arrangements are well known to those skilled in the art of Vehicle to Grid technology, and in the interest of brevity will not be further described.

Responsive to respective signals from control circuit 30, and as illustrated in stage 5000, the bi-directional converter 210 coupled to first PEV 80 is arranged to draw electrical energy from first PEV 80 through a first port of the respective bi-directional converter 210 and provide the drawn electrical energy to DC bus 60 through a second port of the respective bi-directional converter 210, as shown by the respective arrow. Further responsive to respective signals from control circuit 30, and as illustrated in stage 5010 the bi-directional converter 210 coupled to second PEV 80 is arranged to draw electrical energy from DC bus 60 through a second port of the respective bi-directional converter 210 and provide the drawn electrical energy to second PEV 80 through a first port of the respective bi-directional converter 210, thus charging second PEV 80 from the on-board storage of first PEV 80 as shown by the respective arrow.

In one embodiment, as illustrated in optional stage 5020, the amount of electrical energy provided to DC bus 60 from first PEV 80 is substantially identical to the amount of electrical energy drawn from DC bus 60 to be provided to second PEV 80, and thus there is no electrical energy drawn from AC grid 15 or from electrical storage units 50 while still charging second PEV 80. Since each of bi-directional DC/DC converters 210 experience a certain amount of loss, any determination of amounts of electrical energy are preferably determined at the respective second port thereof, as determined by the respective current sensor 55.

In another embodiment, as illustrated in optional stage 5030, the amount of electrical energy provided to DC bus 60 from first PEV 80 is less than the amount of electrical energy drawn from DC bus 60 to be provided to second PEV 80, and thus the difference in energy required to charge second PEV 80 is drawn from AC grid 15 and/or from electrical storage units 50.

In another embodiment, as illustrated in optional stage 5040, the amount of electrical energy provided to DC bus 60 from first PEV 80 is greater than the amount of electrical energy drawn from DC bus 60 to be provided to second PEV 80, and thus the difference in energy is stored on electrical storage units 50, and/or provided to AC grid 15.

The above has been described in relation to a modification of electric vehicle fast charging station 10, wherein each of the bidirectional converters 210 are DC/DC converters, as illustrated in optional stage 5050, however this is not meant to be limiting in any way. Similarly, electric vehicle fast charging station 100 may be modified by replacing AC/DC charging units 130 with bi-directional AC/DC converters, as illustrated in optional stage 5060.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination. In the claims of this application and in the description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting. No admission is made that any reference constitutes prior art. The discussion of the reference states what their author's assert, and the applicants reserve the right to challenge the accuracy and pertinency of the cited documents. It will be clearly understood that, although a number of prior art complications are referred to herein, this reference does not constitute an admission that any of these documents forms part of the common general knowledge in the art in any country.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A station comprising: a control circuit; a bidirectional interface for coupling to an AC grid; and a plurality of N flywheel based electrical storage units coupled to said bidirectional interface, wherein said control circuit is arranged to: determine a demand for electrical power of an amount Preq; determine a maximum amount of allowed ripple current associated with the demand for electrical power; determine available power from each of said plurality of N flywheel based electrical storage units; select M+1 of said plurality of flywheel based electrical storage units having a highest determined available power such that the power available from the selected M of said plurality of flywheel based electrical storage units is less than Preq, and that the power available from the selected M+1 of said plurality of flywheel based electrical storage units is greater than, or equal to, Preq; determine a desired change in output current for each of said N plurality of flywheel based electrical storage units; reduce the output current of one of said N plurality of flywheel based electrical storage units for which said determination indicates a negative desired change up to the determined maximum ripple current; increase the output current of one of said N plurality of flywheel based electrical storage units for which said determination indicates a positive desired change up to the determined maximum ripple current; compare the output current of said N plurality of flywheel based electrical storage units to said determined desired changes; repeat said reducing, increasing and comparing until said determined desired change in output current for each of said N plurality of flywheel based electrical storage units is implemented; and provide the power to the AC grid.

2. The station of claim 1, wherein said bidirectional interface comprises a bidirectional AC/DC converter, and wherein the station further comprises:
at least one of an AC/DC charging and a DC/DC charging unit coupled to said one of a bidirectional AC/DC converter and arranged for coupling to a plug in electrical vehicle.

3. The station according to claim 2, wherein said control circuit is further in communication with a distribution service operator, said control circuit arranged to provide power to the AC grid responsive to a first request from the distribution service operator, and draw power from the AC grid responsive to a second request from the distribution service operator, and wherein said control circuit is further arranged to allocate a storage ability of said plurality of N flywheel based electrical storage units among:
- a first portion allocated to provide power to said at least one AC/DC charging unit or DC/DC charging unit;
- a second portion allocated to absorb electrical energy from said AC grid; and
- a third portion allocated to provide electrical energy to said AC grid.

4. The station according to claim 3, wherein said first portion, second portion and third portion are allocated responsive to historical data.

5. The station of claim 1, further comprising:
a DC/DC charging unit arranged for coupling to a plug in electrical vehicle, and wherein said bidirectional interface comprises a bidirectional AC/DC converter,
each of said plurality of flywheel based electrical storage units coupled to a common DC bus to provide power to said DC/DC charging unit and to provide power to, or receive power from, said bidirectional AC/DC converter.

6. The station of claim 5, further comprising:
a voltage sensor coupled to the common DC bus and in communication with said control circuit;
a current sensor coupled to the DC/DC charging unit and in communication with said control circuit; and
a power sensor coupled to the bidirectional AC/DC converter and in communication with said control circuit, said control circuit arranged to determine the amount of power drawn by, or provided from, the station, responsive to said power sensor coupled to the bidirectional AC/DC converter.

7. The station of claim 1, further comprising:
an AC/DC charging unit arranged for coupling to a plug in electrical vehicle, and wherein said bidirectional interface comprises a bidirectional AC/DC converter, said AC/DC charging unit coupled to a common node of the station,
each of said plurality of flywheel based electrical storage units coupled to a common DC bus to provide power to, or receive power from, said bidirectional AC/DC converter;
a first power sensor coupled between the AC grid and the common node, said first power sensor in communication with said control circuit; and
a second power sensor coupled between the common node and said bidirectional AC/DC converter, said second power sensor in communication with said control circuit.

8. The station according to claim 1, wherein said control circuit is further arranged to:
determine an amount of power to store, Pavail;
determine a maximum amount of allowed ripple current associated with the amount of power to store;
determine available power storage from each of said plurality of N flywheel based electrical storage units;
select M+1 of said plurality of flywheel based electrical storage units having the lowest determined available power such that the power available from the selected M of said plurality of flywheel based electrical storage units is greater than Pavail, and that the power available from the selected M+1 of said plurality of flywheel based electrical storage units is less than, or equal to, Pavail;
determine the desired change in output current for each of said N plurality of flywheel based electrical storage units;
increase the output current of one of said N plurality of flywheel based electrical storage units for which said determination indicates a positive desired change up to the determined maximum ripple current;
decrease the output current of one of said N plurality of flywheel based electrical storage units for which said determination indicates a negative desired change up to the determined maximum ripple current;
compare the output current of said N plurality of flywheel based electrical storage units to said determined desired changes; and
repeat said increasing, reducing and comparing until said determined desired change in output current for each of said N plurality of flywheel based electrical storage units is implemented.

9. The station according to claim 1, wherein said control circuit is further in communication with a distribution service operator, said control circuit arranged to provide power to the AC grid responsive to a first request from the distribution service operator, and draw power from the AC grid responsive to a second request from the distribution service operator.

10. A method of controlling a plurality of N flywheel based electrical storage units comprising: determining a demand for electrical power of an amount Preq; determining a maximum amount of allowed ripple current associated with the demand for electrical power; determining available power from each of the plurality of N flywheel based electrical storage units; selecting M+1 of said plurality of flywheel based electrical storage units having a highest determined available power such that the power available from the selected M of said plurality of flywheel based electrical storage units is less than Preq, and that the power available from the selected M+1 of said plurality of flywheel based electrical storage units is greater than, or equal to, Preq; determining a desired change in output current for each of said N plurality of flywheel based electrical storage units; reducing the output current of one of said N plurality of flywheel based electrical storage units for which said determination indicates a negative desired change up to the determined maximum ripple current; increasing the output current of one of said N plurality of flywheel based electrical storage units for which said determination indicates a positive desired change up to the determined maximum ripple current; comparing the output current of said N plurality of flywheel based electrical storage units to said determined desired changes; repeating said reducing, increasing and comparing until said determined desired change in output current for each of said N plurality of flywheel based electrical storage units is implemented; and providing the power to an AC grid.

11. The method according to claim 10, further comprising: providing power to the AC grid responsive to a first request from a distribution service operator; drawing power from the AC grid responsive to a second request from the distribution service operator; and allocating a storage ability of said plurality of N flywheel based electrical storage units among: a first portion allocated to provide power to at least one AC/DC charging unit or DC/DC charging unit; a second portion allocated to absorb electrical energy from said AC grid; and a third portion allocated to provide electrical energy to said AC grid.

12. The method according to claim 11, wherein said first portion, second portion and third portion are allocated responsive to historical data.

13. The method according to claim 10, further comprising:
  determining an amount of power to store, Pavail;
  determining a maximum amount of allowed ripple current associated with the amount of power to store;
  determining available power storage from each of said plurality of N flywheel based electrical storage units;
  selecting M+1 of said plurality of flywheel based electrical storage units having the lowest determined available power such that the power available from the selected M of said plurality of flywheel based electrical storage units is greater than Pavail, and that the power available from the selected M+1 of said plurality of flywheel based electrical storage units is less than, or equal to, Pavail;
  determining the desired change in output current for each of said N plurality of flywheel based electrical storage units;
  increasing the output current of one of said N plurality of flywheel based electrical storage units for which said determination indicates a positive desired change up to the determined maximum ripple current;
  decreasing the output current of one of said N plurality of flywheel based electrical storage units for which said determination indicates a negative desired change up to the determined maximum ripple current;
  comparing the output current of said N plurality of flywheel based electrical storage units to said determined desired changes; and
  repeating said increasing, reducing and comparing until said determined desired change in output current for each of said N plurality of flywheel based electrical storage units is implemented.

14. The method according to claim 13, further comprising:
  providing power to the AC grid responsive to a first request from a distribution service operator; and
  drawing power from the AC grid responsive to a second request from the distribution service operator.

15. The method according to claim 10, further comprising:
  providing power to the AC grid responsive to a first request from a distribution service operator; and
  drawing power from the AC grid responsive to a second request from the distribution service operator.

* * * * *